United States Patent [19]

Most et al.

[11] 4,413,232
[45] Nov. 1, 1983

[54] METHOD FOR DETECTING METAL OBJECTS IN A NON-METAL CONTAINER BY ROTATING THE CONTAINER THROUGH A PLANE OF DETECTION

[76] Inventors: Lynn W. Most, 1787 N. Rivercrest Rd., Lakeland, Minn. 55043; Allen F. Most, 11701 Leeward Ave. South, Hastings, Minn. 55033

[21] Appl. No.: 233,672

[22] Filed: Feb. 11, 1981

Related U.S. Application Data

[63] Continuation of Ser. No. 941,042, Sep. 11, 1978, Pat. No. 4,266,193.

[51] Int. Cl.³ .................... G01R 33/12; G01N 27/72
[52] U.S. Cl. .................................... 324/236; 324/262
[58] Field of Search ............... 324/225, 226, 228, 234, 324/236–238, 261, 262; 340/551, 552, 568, 572

[56] References Cited

U.S. PATENT DOCUMENTS

| | | | |
|---|---|---|---|
| 3,361,962 | 1/1968 | Albrecht | 324/236 F |
| 3,893,222 | 7/1975 | Kulik et al. | 324/243 F |
| 3,996,512 | 12/1976 | Guichard | 324/236 |
| 4,266,193 | 5/1981 | Most et al. | 324/236 |

FOREIGN PATENT DOCUMENTS 895089 5/1962 United Kingdom ................ 324/236

Primary Examiner—Gerard R. Strecker
Assistant Examiner—Walter E. Snow
Attorney, Agent, or Firm—John S. Munday

[57] ABSTRACT

A device for detecting metallic objects in a container having a substantial quantity of non-metals therein including a frame having a verticle portion with respect to the ground. Metal detecting means are mounted on the verticle portion of the frame such that the metal detecting means defines a plane of detection. This plane of detection has a length defined as "L" which is substantially equal to the length of the detecting means, and the plane has a width extending parallel to the ground and away from the detector equal to distance "R". A container means of non-metallic material may be provided for holding a quantity of non-metal which might contain metallic objects therein. The container has an effective or operative length less than or equal to L and a diameter less than 2R. Container means may be provided to rotate the container means about an axis of rotation parallel to length L and less than distance R from said detecting means. Alarm means for signalling the presence of a metallic object passing through the plane of detection during rotation of the support means is also provided.

1 Claim, 1 Drawing Figure

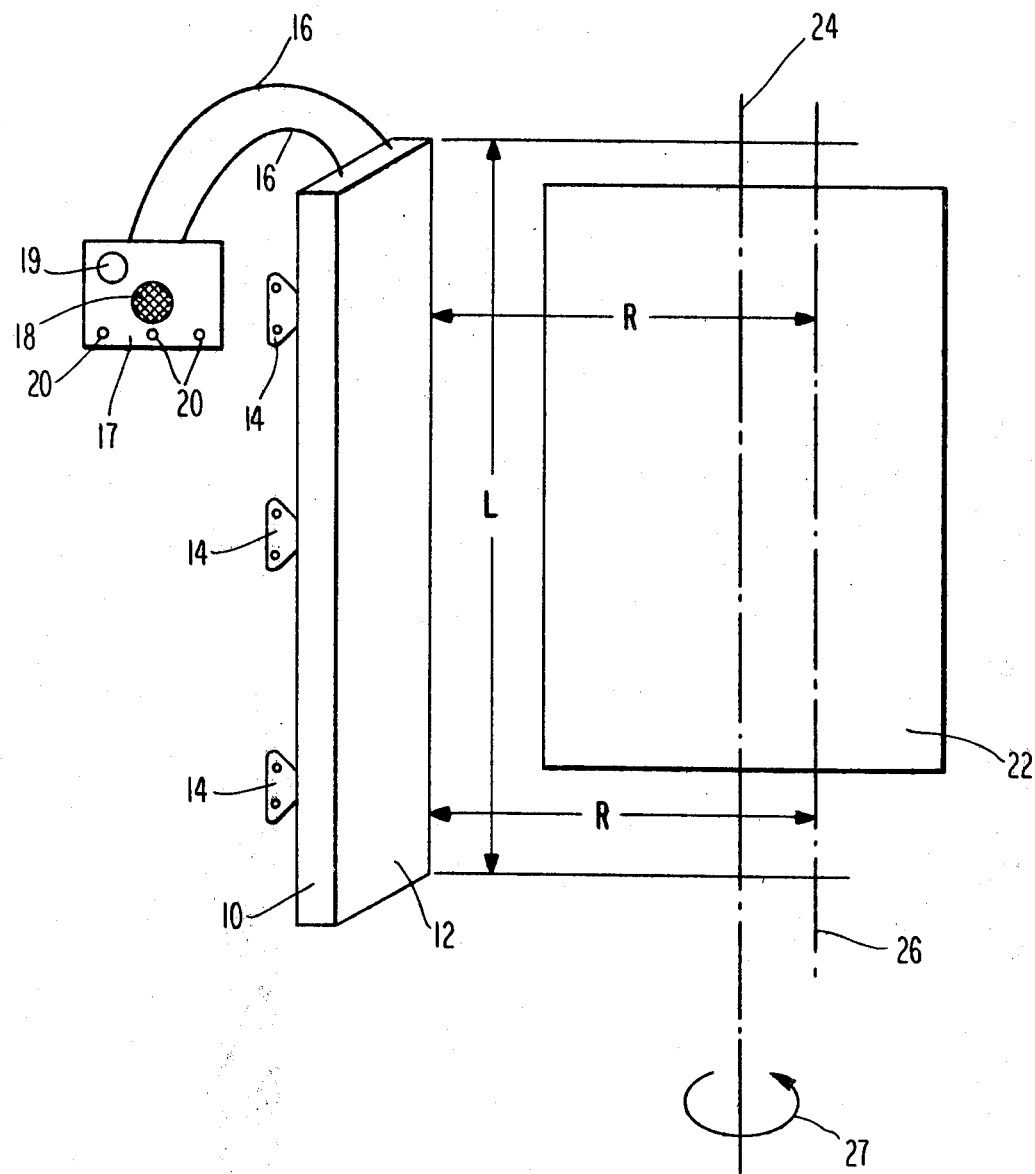

METHOD FOR DETECTING METAL OBJECTS IN A NON-METAL CONTAINER BY ROTATING THE CONTAINER THROUGH A PLANE OF DETECTION

BACKGROUND OF THE INVENTION

This is a continuation of our copending patent application filed Sept. 11, 1978, having Ser. No. 941,042 now U.S. Pat. No. 4,266,193.

The loss of metallic products such as silverware is becoming a major economic problem in a wide variety of industries. The loss of kitchen utensils in garbage and linen has been calculated as being as high as the cost of an additional employee for food operations. In days of inflation, improper cost control can severly impact upon the likelihood of success of such an organization.

The prevention of such a loss, however, is not economically justified by the addition of another employee to the working force, since that additional cost must still be passed on to the consumer. Furthermore, candidates for the task of sorting through refuse for the purpose of saving a knife or fork are not highly motivated, and the skill applied to the task is often times not satisfactory.

In point of fact, those employees assigned the task of removing the refuse and linen from kitchens and other sources of non-metallic material are most often the lowest paid workers with the least amount of professional pride. Economics force such a result, even though the results are not highly economic.

Similar problems exist in other industries where valuable metallic items become intermingled with less valuable non-metals. For example, expensive surgical instruments are misplaced among operating room linen even though the professional skill of those workers is great. Laundry companies have been known to fail to return valuable clamps, forceps and scalpels either for failure to clearly identify the proper customer or as compensation for damage or inconvenience incurred in finding the metal goods.

Some prior art devices have been used to detect metal, but none have been provided which are easy to use by even the most unskilled or hurried worker. U.S. Pat. No. 3,361,962 teaches a detector which requires a transmission source on one side of the object and a receiving means on the other side of the object being scanned. No plane of detection is suggested. British Pat. No. 895,089 also has detecting means that require the object being scanned to pass between the two upward extending members to again effect a transmission and receiving side.

SUMMARY OF THE INVENTION

It has now been discovered that the objects of this invention can be accomplished in the following manner. The present invention relates to a device for detecting metallic in a container having a quantity of non-metals therein. The device contains a frame and metal detecting means mounted on the frame. The metal detecting means is adapted to define a plane of detecting having a length L substantially equal to the length of the detecting means and a width equal to a distance R extending away from the detecting means.

Also provided as an embodiment of the invention is a non-metallic container means for holding a substantial quantity of non-metal which might contain metallic objects therein. The container should have a length or first dimension less than or equal to L, as defined above, and a second dimension or width less than 2R. The container may be a reuseable can or bucket made of plastic and adapted to rotate about an axis which can be placed parallel to dimension L and less than R from the detection means. The container may also be a non-metallic bag such as is used in hospital operating rooms to collect linen and which can be rotated about an axis as previously defined. The present invention is admirably suited for use in close quarters of a hospital where it can be wall mounted and used as just described. Different surgical instruments give significantly different readings, particularly when they are in varying positions. The large clamps used for heart surgery, for example, will only give a reading when they are not presenting a point target to the detector. Thus rotation of the container means causes all of the insides of said container means to pass through said plane of detection in different positions to insure detection.

Finally, alarm means which may be both audible or visible are provided for signalling the presence of metallic objects passing through said plane of detection during rotation of said support means.

BRIEF DESCRIPTION OF THE DRAWING

The FIGURE shows a simplified partially sectioned view of the preferred embodiment of this invention.

DESCRIPTION OF THE PREFERRED EMBODIMENT

As shown in the FIGURE, a device for detecting metallic objects in a container having a substantial quantity of non-metals is provided. The device has a frame 10 mounted which contains the detector means 12 and has wall mounting flanges 14 for mounting in a verticle position with respect to the ground. The detector means provides a plane of detection having a length L equal to the length of detector 12, and a width equal to distance R as shown in the FIGURE.

Metal detectors such as shown in the FIGURE, operate on a radio wave principle and are commercially available from C & G Technology, Inc., Phoenix, Ariz. All that is required is that the detector means is capable of identifying metal as it passes through the plane defined by distances L and R. A control box 17 is provided with a battery power source to permit portability. Alarm speaker 18, alarm light 19, and controls 20 can be located in control box 17. Also provided is a non-metallic container means 22 which has a length or height of less than or equal to L, the height of the detector means 12 and a width or diameter of less than 2R. These dimensions permit placement of the container means 22 such that all of its interior may be scanned for the presence of metal.

The container is placed in the plane of detection by placing its axis 24 inside the outer ends of distance R, shown by axis 26 as shown in the FIGURE. Rotation of the container about axis 24 in the direction of arrow 27 such that axis 26 is parallel to the length L of the detector means 12 and which is less than distance R from said detector means 12 will permit the plane of detection to scan the contents of container 22. Objects which are oriented in any direction will be passed through the plane, which in practice has some width, and point targets will be eliminated. Tests have been run which demonstrated the effective operation of the detector means. Alarm means 18 and 19 are adapted to signal the presence of metallic objects passing through the plane of detection during rotation of container 18.

Many uses for the device of this invention will become apparent to one skilled in the art upon reading the instant disclosure. Restaurants and hospitals, schools, colleges and food service operations are only some of many facilities which require a simple, easy to operate yet effective means for detecting the presence of metal in and among relatively large quantities of non-metals.

Having thus described the invention, what is claimed is:

1. A method of detecting metallic objects in a quantity of non-metal, comprising the steps of:
   generating a plane of detection having a length "L" and a width "R";
   bringing a container holding a quantity of non-metal which potentially contains metallic objects into said plane of detection, and rotating said container about an axis substantially parallel to length L and less than distance R from the generator of said plane and;
   operably connecting an alarm means to be responsive to disturbances in said plane of detection during the rotation of said container in said plane caused by the presence of metal therein.

* * * * *